United States Patent
Van Damme et al.

(10) Patent No.: US 12,143,166 B2
(45) Date of Patent: Nov. 12, 2024

(54) APPARATUS AND METHOD FOR GENERATING AN ESTIMATE OF A CHANNEL FREQUENCY RESPONSE

(71) Applicant: Nokia Solutions and Networks Oy, Espoo (FI)

(72) Inventors: Axel Van Damme, Loyers (BE); Nicolas Dupuis, Chaudfontaine (BE); Philippe Dierickx, Saint-Gery (BE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 29 days.

(21) Appl. No.: 17/874,715

(22) Filed: Jul. 27, 2022

(65) Prior Publication Data
US 2023/0032603 A1 Feb. 2, 2023

(30) Foreign Application Priority Data

Jul. 29, 2021 (EP) .................................. 21188552

(51) Int. Cl.
*H04B 17/391* (2015.01)

(52) U.S. Cl.
CPC .............................. *H04B 17/3912* (2015.01)

(58) Field of Classification Search
CPC ................................................... H04B 17/3912
USPC ......................................................... 375/341
See application file for complete search history.

(56) References Cited

U.S. PATENT DOCUMENTS

2022/0376956 A1* 11/2022 Wesemann ............ H04L 1/0061

* cited by examiner

*Primary Examiner* — Leila Malek
(74) *Attorney, Agent, or Firm* — Harness, Dickey & Pierce P.L.C.

(57) ABSTRACT

An apparatus, method and computer program is described comprising: combining first features extracted from an echo signal using a convolutional encoder of a convolutional encoder-decoder having first weights, wherein the echo signal is obtained in response to a transmission over a channel or a simulation thereof; and using a convolutional decoder of the convolutional encoder-decoder to generate an estimate of a frequency response of the channel based on the echo signal, wherein the convolutional decoder has second weights.

14 Claims, 12 Drawing Sheets

APPARATUS AND METHOD FOR GENERATING AN ESTIMATE OF A CHANNEL FREQUENCY RESPONSE

CROSS-REFERENCE TO RELATED APPLICATIONS

This application claims priority to and the benefit of European Patent Application No. 21188552.0 filed on Jul. 29, 2021, the entire contents of each of which are incorporated herein by reference.

FIELD

Embodiments as set out in this patent application relate to channel frequency response estimation.

BACKGROUND

Techniques exist that seek to use echo signals obtained in response to a signal transmission over a channel in the estimation of a frequency response of that channel. However, there remains a need for further developments in this field.

SUMMARY

In a first aspect, this specification describes an apparatus comprising means for performing: combining first features extracted from an echo signal using a convolutional encoder of a convolutional encoder-decoder having first weights, wherein the echo signal is obtained in response to a transmission over a channel (e.g. a communications medium) or a simulation thereof; and using a convolutional decoder of the convolutional encoder-decoder to generate an estimate of a frequency response of the channel based on the echo signal, wherein the convolutional decoder has second weights. The frequency response of the channel may be referred to as an H log estimate. The echo signal/response may be an uncalibrated echo response or a calibrated echo response.

The channel may take many forms, such as a cabled (e.g. copper) channel, an optical fibre channel, a wireless channel, a utility grid etc.

In some example embodiments, the means are further configured to perform: obtaining the echo signal in response to a transmission over said channel, wherein the first features are extracted from said obtained echo signal. The first features may be extracted from the obtained echo signal after a data preparation or preprocessing stage.

The echo signal may be represented as a complex signal having real and imaginary parts.

The echo signal may comprise: magnitude data and phase data; and/or a time-domain reflectogram. The time-domain reflectogram may be obtained from the frequency domain signals using an inverse Fourier transform.

In some example embodiments, the means are further configured to perform: estimating a loss, based on a difference between the estimated channel frequency response estimate and a target channel frequency response (e.g. a known channel frequency response); and updating said first and second weights based on the estimated loss. Said weights may be updated using backpropagation. The means may be further configured to perform: obtaining (e.g. receiving) training data; and extracting training features from the training data. The training data may include the target channel frequency response. Alternatively, or in addition, the training data may be based on echo signals in response to a transmission over said channel.

The means may be further configured to estimate said loss based, at least in part, on a root-mean square error between the target channel frequency response and the estimated channel frequency response estimate.

The means may be further configured to estimate said loss based, at least in part, on a hybrid error comprising a weighted sum between a root-mean square error, a local maximum and a weighting over derivatives.

The means may be further configured to perform estimating said loss by: stationarising a batch sample to seek to set each sample in the batch to the same mean; and/or performing a principal component analysis and whitening process on said batch samples.

The means may comprise: at least one processor; and at least one memory including computer program code, the at least one memory and computer program code configured to, with the at least one processor, cause the performance of the apparatus.

In a second aspect, this specification describes a method comprising: combining first features extracted from an echo signal using a convolutional encoder of a convolutional encoder-decoder having first weights, wherein the echo signal is obtained in response to a transmission over a channel or a simulation thereof; and using a convolutional decoder of the convolutional encoder-decoder to generate an estimate of a frequency response of the channel based on the echo signal, wherein the convolutional decoder has second weights.

The method may comprise obtaining the echo signal in response to a transmission over said channel, wherein the first features are extracted from said obtained echo signal. The first features may be extracted from the obtained echo signal in a data preparation stage.

The echo signal may be represented as a complex signal having real and imaginary parts. The echo signal may comprise: magnitude data and phase data; and/or a time-domain reflectogram.

The method may comprise: estimating a loss, based on a difference between the estimated channel frequency response estimate and a target channel frequency response (e.g. a known channel frequency response); and updating said first and second weights based on the estimated loss (e.g. using backpropagation). The method may comprise: obtaining (e.g. receiving) training data; and extracting said training features from the training data.

The loss may be estimated in a number of ways. For example, the loss may be estimated based, at least in part, on a root-mean square error between the target channel frequency response and the estimated channel frequency response estimate. The loss may be estimated based, at least in part, on a hybrid error comprising a weighted sum between a root-mean square error, a local maximum and a weighting over derivatives. The loss may be further estimated by: stationarising a batch sample to seek to set each sample in the batch to the same mean; and/or performing a principal component analysis and whitening process on said batch samples.

In a third aspect, this specification describes an apparatus configured to perform (at least) any method as described with reference to the second aspect.

In a fourth aspect, this specification describes computer-readable instructions which, when executed by a computing apparatus, cause the computing apparatus to perform (at least) any method as described with reference to the second aspect.

In a fifth aspect, this specification describes a computer-readable medium (such as a non-transitory computer-readable medium) comprising program instructions stored thereon for performing (at least) any method as described with reference to the second aspect.

In a sixth aspect, this specification describes an apparatus comprising: at least one processor; and at least one memory including computer program code which, when executed by the at least one processor, causes the apparatus to perform (at least) any method as described with reference to the second aspect.

In a seventh aspect, this specification describes a computer program comprising instructions for causing an apparatus to perform at least the following: combining first features extracted from an echo signal using a convolutional encoder of a convolutional encoder-decoder having first weights, wherein the echo signal is obtained in response to a transmission over a channel or a simulation thereof; and using a convolutional decoder of the convolutional encoder-decoder to generate an estimate of a frequency response of the channel based on the echo signal, wherein the convolutional decoder has second weights.

In another aspect the specification relates to embodiments of a non-transitory computer readable medium comprising program instructions stored thereon for performing at least the following: combining first features extracted from an echo signal using a convolutional encoder of a convolutional encoder-decoder having first weights, wherein the echo signal is obtained in response to a transmission over a channel or a simulation thereof; and using a convolutional decoder of the convolutional encoder-decoder to generate an estimate of a frequency response of the channel based on the echo signal, wherein the convolutional decoder has second weights.

In an eighth aspect, this specification describes an apparatus comprising: a convolutional encoder of a convolutional encoder-decoder (or some other means) for combining first features extracted from an echo signal, wherein the echo signal is obtained in response to a transmission over a channel or a simulation thereof; and a convolutional decoder of the convolutional encoder-decoder (or some other means) for generating an estimate of a frequency response of the channel based on the echo signal. The convolutional encoder may have first weights (which may be trainable). The convolutional decoder may have second weights (which may be trainable).

BRIEF DESCRIPTION OF DRAWINGS

Example embodiments will now be described, by way of non-limiting examples, with reference to the following schematic drawings, in which.

DETAILED DESCRIPTION

Figure 1:
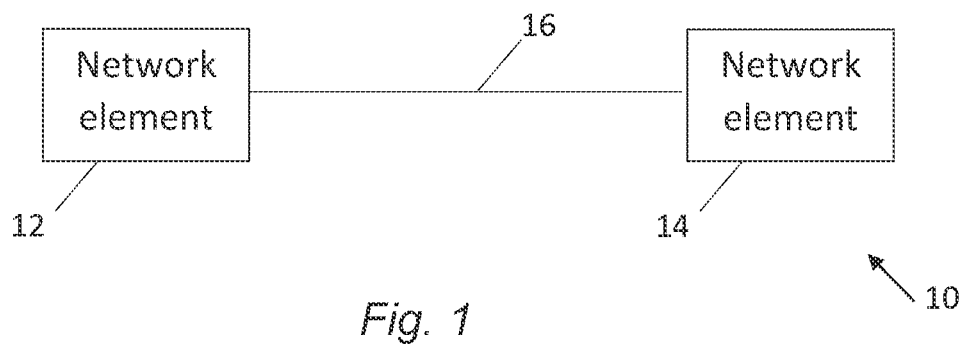
FIG. 1 is a block diagram of an example system.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of an example system, indicated generally by the reference numeral 10. The system comprises a first network element 12 and a second network element 14 connected by a communication link 16.

The network elements 12 and 14 may be part of access nodes or of customer end user equipment of a communication system and may, for example, be located at customer premises and/or a network operator's premises (e.g. with one node being at a network operator and the other at customer premises). The communication link 16 may be a cable, such as a twisted pair of copper wires, but may take many other forms, such as an optical fibre cable or a wireless connection. Moreover, the communication link may comprise a combination of technologies, such as copper cable sections and wireless sections.

In one example embodiment, the communication link 16 is a digital subscriber line (DSL) but may take other forms, such as links of a smart grid (e.g. electrical cables over which communication can take place), Ethernet cables and powered line communication (PLC). The skilled person will be aware of other communication links that could make use of the principles described herein.

Specifically in such communication networks, with the increasing bitrate offers, the deployment of IPTV solutions, Video-On-Demand and Triple-play services etc., the system performance for communication systems, such as the system 10, are becoming increasingly important. The physical link, which transports the information through wire lines up to the end user, is a known bottleneck for Quality of Service (QOS). Hence, it can be useful to be able to remotely diagnose sources of physical problems and take actions to improve performance.

Moreover, recent technology evolutions tend to push the signal bandwidth of communication links, such as DSL lines, higher. In the recent past, traditional ADSL technology used frequencies up to 1.1 MHz, VDSL2 technology can be applied up to 17 or even 35 MHz. The extensive use of those higher frequencies as well as solutions to increase performance can make the communication link 16 more sensitive to disturbances.

Offering solutions to correctly provision, configure, deploy and troubleshoot a communication link offers many advantages.

SELT (Single Ended Line Testing), as defined in ITU-T G.996.2, involves measuring electrical characteristics of any digital subscriber line (xDSL) in order to determine certain properties of the line. As opposed to DELT (Dual Ended Line Testing), SELT tackles the constraint of only conducting measurements at a central office (CO), removing the need for measurement equipment at customer premises (CP) and consequently reducing the operating expenditures (OPEX) for such tests. Note that, although a common use case is to execute a SELT from the central office (CO), it is also possible to execute a SELT measurement from the customer premises (CP).

By contrast, DELT (Dual-Ended Line Testing) is performed using data obtained while modems are operating (operational data, carrier data, etc.). These data are much richer, but typically require equipment operating at both ends of a communications link.

Figure 2:
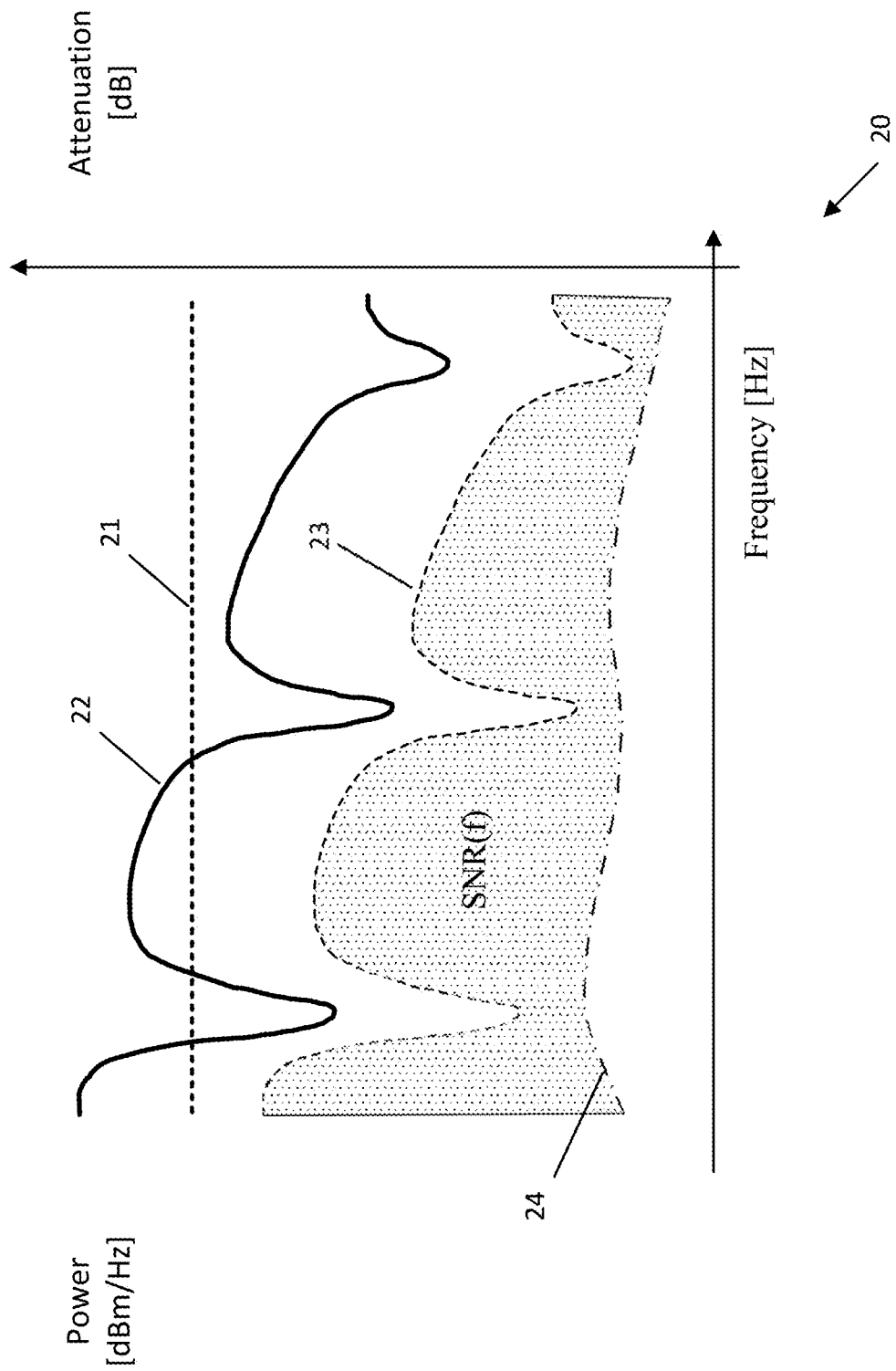
FIG. 2 is a plot showing an example of a number of channel performance metrics.

FIG. 2 is an example plot, indicated generally by the reference numeral 20, showing a number of channel performance metrics, including channel frequency response. In particular, the plot 20 shows transmitted power spectral density (PSD) 21, channel frequency response 22, received PSD 23 and noise PSD 24.

The amplitude of the channel frequency response, commonly called H log when expressed in decibels, is a key metric for many communication systems and can, for example, be used to define the signal-to-noise ratio (SNR) of a link. The channel frequency response 22 is the attenuation of the medium of the frequency.

Figure 3:
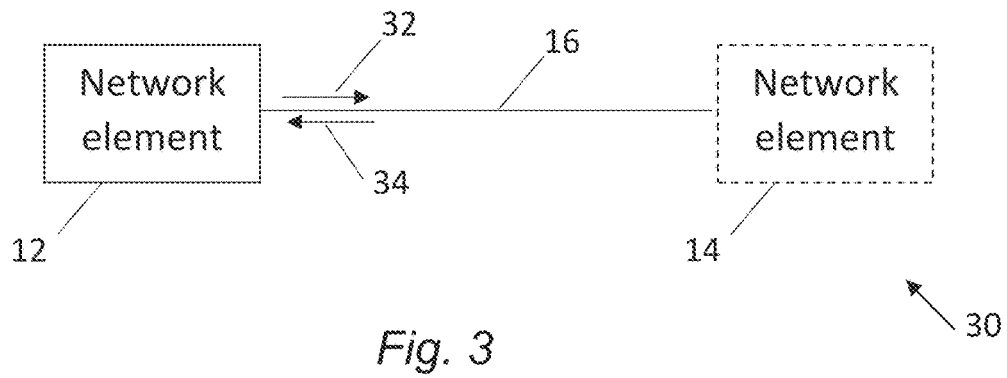
FIG. 3 is a block diagram of a system in accordance with an example embodiment.

FIG. 3 is a block diagram of a system, indicated generally by the reference numeral 30, in accordance with an example embodiment. The system 30 comprises the first network element 12, the second network element 14 and the communication link 16 of the system 10 described above. The network elements 12 and 14 may be configured for communicating over the communication link 16 based on DSL technology.

In some example embodiments, SELT measurements involve the network element 12 sending an excitation signal 32 over the communication link 16 and measuring a received (echo) signal 34 on the communication link. The echo response of the communication link 16 represents the estimated mean value of the voltage ratio V(f)/E(f), where E(f) is the excitation signal and V(f) is the measured return signal at frequency f. This is typically referred to as an uncalibrated echo response (UER). As discussed further below, calibration techniques allow the conversion of a UER to a calibrated echo response (CER). It should be noted that a SELT measurement is typically performed without the network element 14 being connected on the communication line 16; thus the network element 14 in the system 30 is optional and is shown in dotted form in FIG. 3.

Patterns and signatures may be extracted from U/CERs in order to derive information, such as loop length, loop termination etc.

Figure 4:
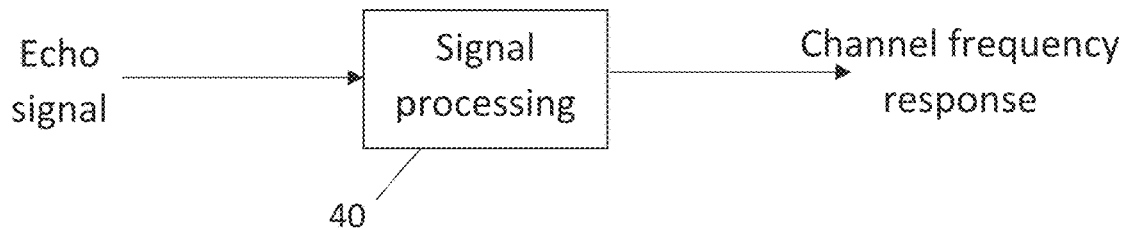
FIG. 4 is a block diagram of a signal processing module in accordance with an example embodiment.

FIG. 4 is a block diagram of an apparatus 40 comprising a processor/memory forming together in an embodiment a signal processing module, in accordance with an example embodiment. This apparatus receives at one or more inputs an echo signal in response to a transmission over a channel (e.g. an uncalibrated or calibrated echo response, as discussed above). The apparatus 40 generates an estimate of a channel frequency response (H log) based on the echo response for provision at one or more outputs.

Figure 5:
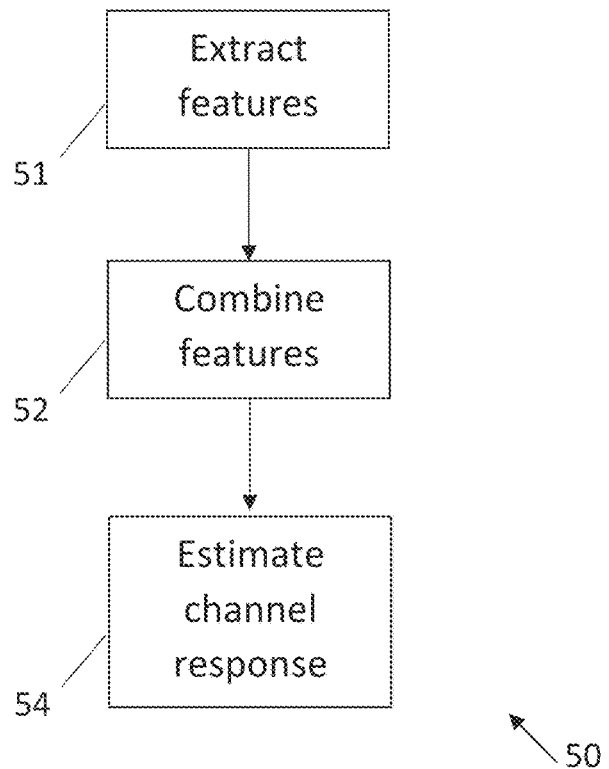
FIG. 5 is a flow chart showing a method or algorithm in accordance with an example embodiment.

FIG. 5 is a flow chart showing method steps, e.g. an algorithm, indicated generally by the reference numeral 50, in accordance with an example embodiment. The algorithm 50 may be implemented by/using the apparatus 40.

The example method 50 starts at operation 51, where first features are extracted from an echo signal. The features are extracted using a convolutional encoder of a convolutional encoder-decoder having first weights. The echo signal may have been obtained via measurements, e.g. in response to a transmission of a reference signal over a channel (such as the communication link 16) or by a simulation thereof. As discussed in detail below, the at least one echo signal input may take many different forms, including frequency domain reflectometry (expressed as real and imaginary signals, amplitude and phase signals or amplitude and phase signals with computed time domain reflectometry signals) or time domain reflectometry signals. In the example embodiment described in detail below, we use frequency domain reflectometry including amplitude and phase signals with computed time domain reflectometry signals, but other signal formats are possible.

At operation 52 the features extracted in operation 51 are combined and at operation 54, a convolutional decoder of a convolutional encoder-decoder of apparatus 40 is used to generate an estimate of a frequency response of the channel (H log) based on the echo response, wherein the convolutional decoder has second weights.

Figure 6:
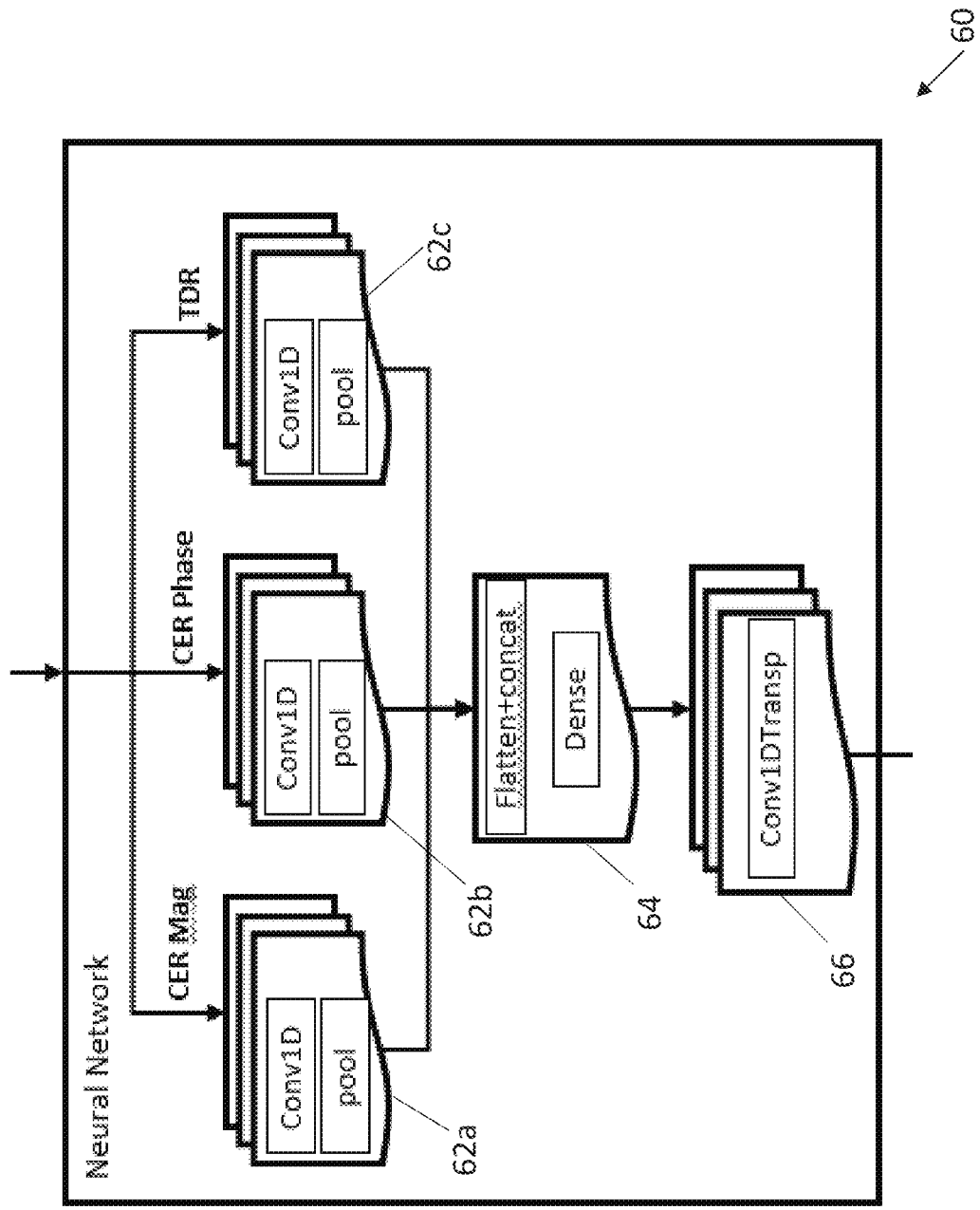
FIG. 6 is a block diagram of a system in accordance with an example embodiment.

FIG. 6 is a block diagram of a system, indicated generally by the reference numeral 60, in accordance with an example embodiment. The system 60 implements a convolutional encoder-decoder and may be used to implement the method 50 described above. Thus, the system 60 may form part of the apparatus 40 described above.

In this embodiment, the system 60 comprises a convolution encoder consisting of a first branch comprising convolution encoder modules 62a, a second branch comprising convolution encoder modules 62b, a third branch comprising third convolution encoder modules 62c, and a concatenation module 64. The system 60 further comprises a deconvolution encoder comprising a pool of deconvolution modules 66.

The convolution encoder is part of a neural network 60 performing successive layers of convolution and pooling in order to create and extract relevant features from the U/CER's inputs. Once these features are isolated, they are transformed, by deconvolution layers of the deconvolution module 66, into sequences. Over the deconvolution layers, these sequences get refined and extended up-to be able to produce a H log curve.

The input data of the encoders consist of C/UERs that are typically represented in a complex format, i.e. real and complex values for respective frequencies or tones. This representation can be transformed (e.g. by part of the signal processing module 40) into another representation for processing by the system 60, such as frequency domain magnitude and phases. A time-domain reflectogram (TDR) can also be computed from the C/UER. This enables magnitude (CER mag) and phase (CER phase) data to be generated specifying the echo response and time-domain data (TD) associated with the echo response. Of course, as noted above, the echo input data may be represented in other forms.

The magnitude data (CER Mag) may be a vector specifying the frequency-domain magnitude of the echo response for respective frequencies or tones, the phase data (CER phase) may be a vector specifying the frequency-domain phase of the echo response for respective frequencies or tones, and the time-domain data may be a vector specifying the time-domain reflectogram of a communications link.

In the case of measured frequency-domain reflectogram (FDR), the CER/UER may be directed measured as a function of the frequency: V(f)/E(f), where E(f) is the excitation frequency. Then, with this complex vector (comprising real and imaginary parts), the corresponding time-domain reflectogram (TDR) may be computed using Fourier transformation. In the case of measured time-domain reflectogram (TDR), the CER/UER may be directed measured as a function of time: V(t)/E(t), where E(t) is the excitation signal.

In the system 60, the input data as provided to the convolution encoder are represented as magnitude data (CER Mag), phase data (CER phase) and a time-domain reflectogram (TDR), as discussed above. The use of CER Mag, CER Phase and TDR signals inputs to a convolutional encoder has been found to be effective, but it is not essential. Other data formats can be used instead of, or in combination with, the data formats of the system 60. For example, the time-domain reflectogram may be omitted in some example embodiments. Further, in some example embodiments, only the time-domain reflectogram is provided.

Once those input transformations are performed (e.g. by part of the signal processing module 40), each one of them follows its own path of convolutional stacked layers. In the system 60, the CER Mag data are processed by the first convolution encoder module 62a, the CER Phase data are processed by the second convolution encoder module 62b and the TDR data are processed by the third convolution encoder module 62c. In this way, specific convolutional feature extraction is tailored to a signal type. This way of signal processing allows different filter size, filter weights, channel numbers and pooling factors to be used for each input signal.

The outputs of those convolutional feature extraction branches (i.e. the convolution encoder modules 62a to 62c) are concatenated with each other (by the concatenation module 64) and then passed to a fully connected layer that aims to create a latent space of lower dimension that combines features extracted from the input signals. This latent space will be the starting point of the h log signal reconstruction by the layers of the deconvolution module 66. Module 64 is thus configured to perform the combing step 52 of FIG. 5.

The deconvolution module 66 (or transposed convolutional layers) offers a learnable way of upsampling an input and can be used to intelligently project an input feature map to a higher spatial space. Several transposed convolutional layers may be stacked to transform the feature map into a H log having a length, for example, of 512 tones.

Figure 7:
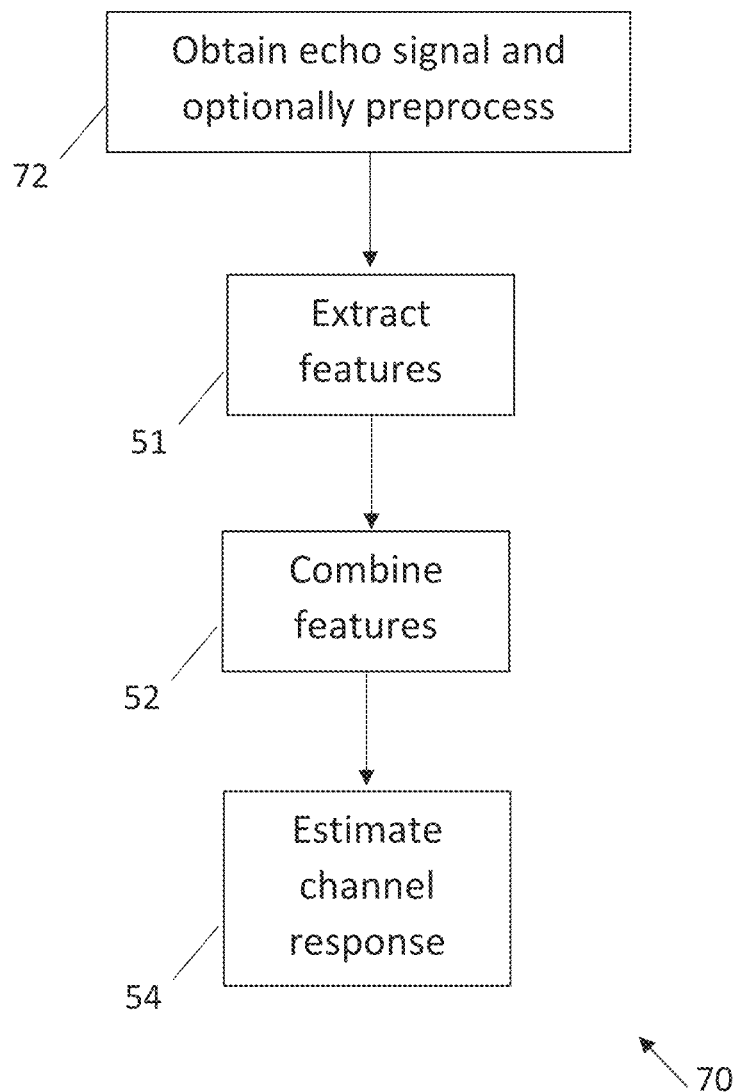
FIG. 7 is a flow chart showing a method or algorithm in accordance with an example embodiment.

FIG. 7 is a flow chart showing method steps or an algorithm, indicated generally by the reference numeral 70, in accordance with an example embodiment. The algorithm 70 may be implemented using the signal processing module 40.

The method 70 starts at operation 72, where an echo signal is obtained in response to transmission of data over a channel (such as the communication link 16) or a simulation thereof. As discussed above, the echo signal may be represented as a complex signal having real and imaginary parts, but other formats are possible. As mentioned these measurements can be optionally further preprocessed, enabling a better operation of the next step of feature extraction.

At operation 51 of the algorithm 70, features are extracted from the echo signal. As discussed above, before the extraction of the features by the convolutional encoder, some preprocessing could have taken place (in step 72 of FIG. 7) on the echo signal such as to transform the echo inputs into magnitude and phase signals (in the frequency domain). Features can also be extracted from a time domain reflectogram.

With features extracted from an obtained and possibly preprocessed echo signal, the algorithm 70 moves to the next operation where, as discussed above, the first features extracted in the operation 51 are combined in operation 52 and further sent to a convolutional decoder of a convolutional encoder-decoder for performing the estimation of the channel frequency response. The convolutional encoder-decoder combination can be realized e.g. by the neural network of FIG. 6 showing convolution encoder modules 62a to 62c and the concatenation module 64 of the system 60. The convolutional encoder may have first weights, which may be trainable, as discussed further below.

At operation 54, a convolutional decoder of a convolutional encoder-decoder (such as the deconvolution module 66 of the system 60) is used to generate an estimate of a frequency response of the channel based on the echo response. The convolutional decoder may have second weights, which may be trainable, as discussed further below.

Figure 8:
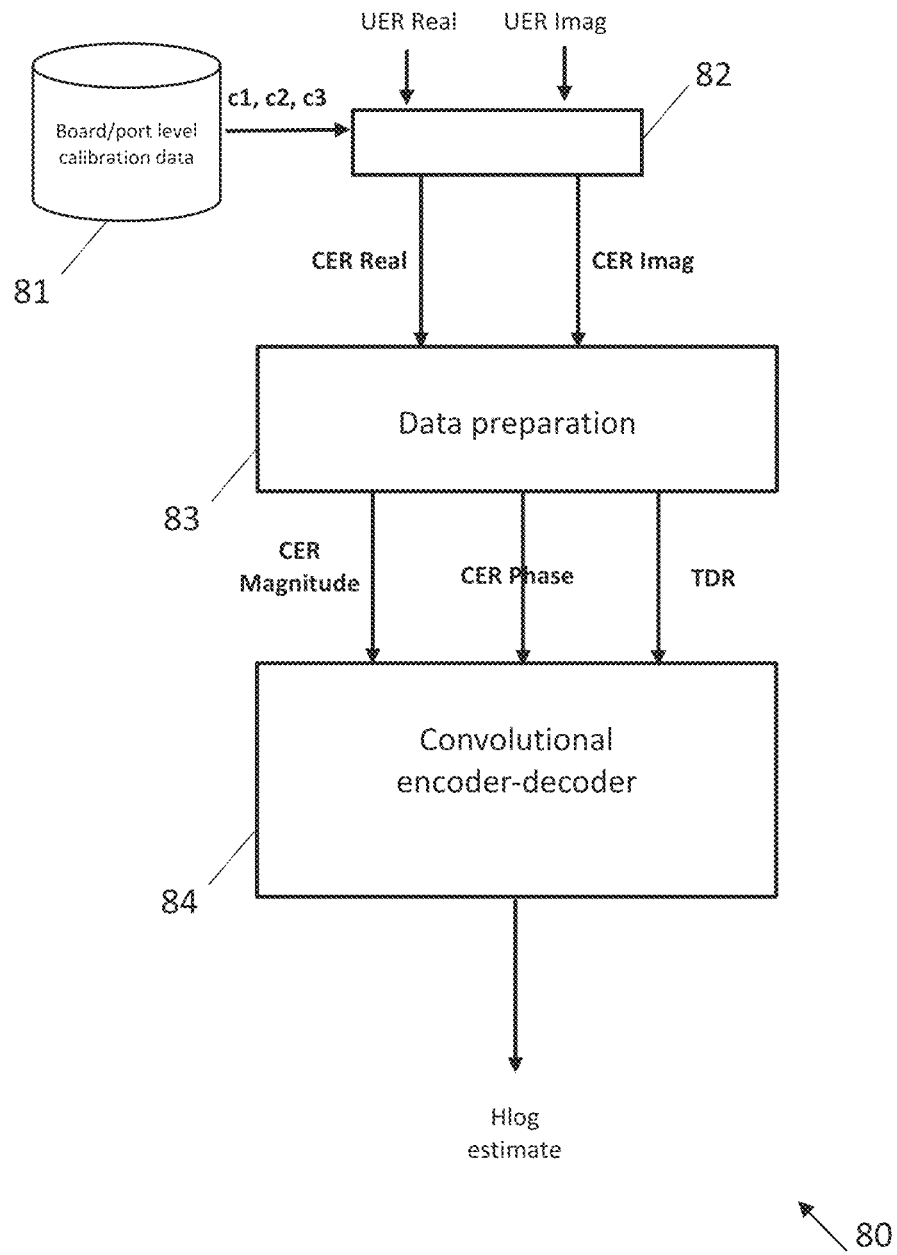
FIG. 8 is a block diagram of a system in accordance with an example embodiment.

FIG. 8 is a block diagram of a system, indicated generally by the reference numeral 80, in accordance with an example embodiment. The system 80 may be used to implement the algorithm 70 described above. The system 80 provides details of an example implementation of the apparatus 40 described.

The system comprises a calibration memory module 81, a calibration module 82, a data preparation module 83 and a convolutional encoder-decoder module 84.

The calibration module 82 receives an uncalibrated echo signal represented as a complex signal having real and imaginary parts and also receives the corresponding calibration coefficient from the calibration memory module 81. The calibration module 82 provides a calibrated echo signal represented as a complex signal having real and imaginary parts to the data preparation module 83. By way of example, SELT-PMD calibration is explained in detail in the BBF RE-347 document (https://www.broadband-forum.org/download/TR-347.pdf), which explains how a CER can be computed from a UER. Module 81 is configured to store the needed calibration measurements, and can thus be considered as a memory for storing the UERload, UERopen and UERshort calibration measurements or alternatively also directly store their corresponding coefficients C1, C2, C3. Then module 82 can use these coefficients to compute CER using the mentioned formulas in TR-347.

So module 81 is a memory for storing UERload/UERopen/UERshort measurements or for storing C1/C2/C3 calibration coefficients in accordance with aforementioned document.

The data preparation module 83 processes the calibrated echo signal based on the input requirements of the convolutional encoder-decoder. For example, as shown in the system 80, the data preparation module 83 may convert the calibrated echo signal into CER Magnitude, CER Phase and TDR signals. Modules 81, 82 and 83 can together thus be considered as an example embodiment to perform preprocessing of the obtained echo measurement data. In an alternative embodiment memory module 81 can be external to the system 80.

The convolutional encoder-decoder 84 generates an estimate of a frequency response of the channel based on the inputs received from the data preparation module 83. Thus, the convolutional encoder-decoder 84 may be used to implement the operations 51, 52 and 54 of the algorithms 50 and 70.

The convolutional encoder-decoder 84 uses a machine-learning approach in order to learn from valid and various examples. The (calibrated/uncalibrated) echo response (U/CER) contains information about factors such as the effects of the communication medium characteristics, the local events (intermediate reflexions), the patterns related to impairments (topology of the medium) and about general medium characteristics (termination, length . . . ) etc. An Advantage of leveraging machine learning is that the information about these phenomena are not formally documented (i.e. no formal theory for any effects) and, as such and besides their complexity, that empirical signal processing algorithms may not be robust, accurate or even feasible.

Figure 9:
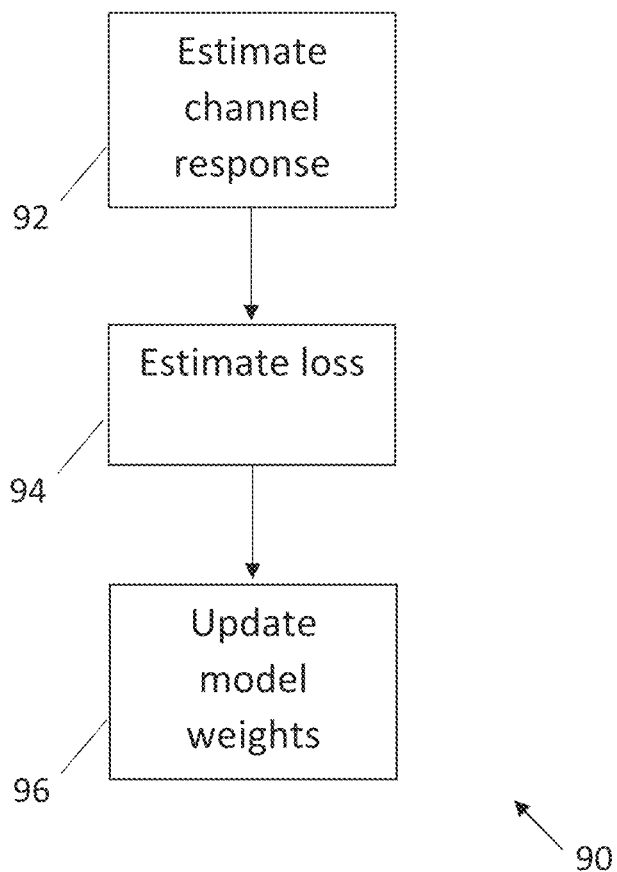
FIG. 9 is a flow chart showing a method or algorithm in accordance with an example embodiment.

FIG. 9 is a flow chart showing an example method or algorithm, indicated generally by the reference numeral 90, in accordance with an example embodiment.

The algorithm 90 starts at operation 92, where a channel frequency response is estimated for specific training data sets which are determined beforehand. For example, the operation 92 may be implemented using the algorithm 70 or some similar algorithm.

Such a training set should contain examples of CERs and the corresponding H logs. This means that for each different network topology (loop length, cable type, termination, presence or not of impairments like bridged-tap, contact issue or others, . . . ), a training set the CER (input) and corresponding H log (=target) is to be provided. The training sets could be obtained, for example, by systematic lab measurements, but it would be extremely time consuming to cover all possible cases. Indeed, a system leveraging Deep Learning would requires a lot of examples (perhaps hundreds of thousands or millions) to be able to converge.

Alternatively a training set can also be obtained via simulations, which represent different loop topologies and which are able to generate the CERs and corresponding H logs. This enables the correct labelling of simulator data and may be used to generate millions of training data sets.

At operation 94, a loss is estimated, based on a difference between a synthesized channel frequency response estimate (e.g. as estimated in the operation 92) and a target channel frequency response e.g. a known channel frequency response as being part of the training data set.

At operation 96, model weights used to generate the channel estimate (e.g. the first and second weights discussed above) are updated based on the loss estimated in the operation 94. For example, the model weights may be updated using backpropagation.

Figure 10:
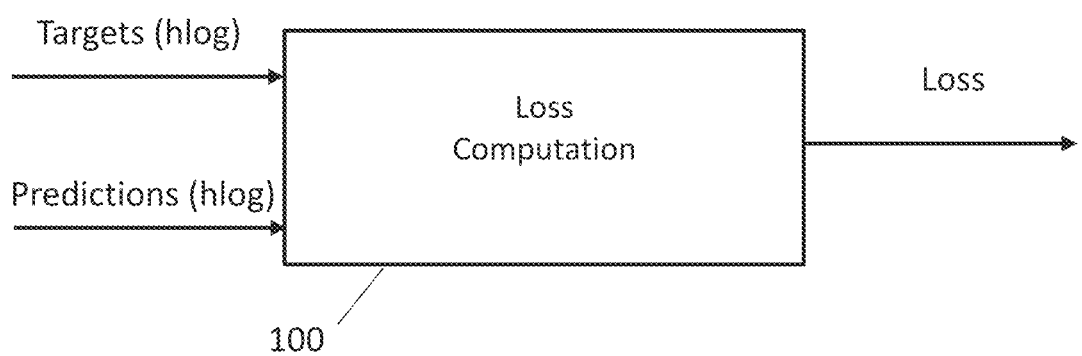
FIG. 10 is a block diagram of a loss computation module in accordance with an example embodiment.

FIG. 10 is a block diagram of a loss computation module 100 in accordance with an example embodiment. The loss computation module 100 may be used to implement the operation 90 and is as well part of the apparatus 40.

As shown schematically in FIG. 10, the loss computation module 100 receives a predicted channel response estimate (e.g. as obtained in the operation 92, at the output of the convolutional decoder), receives a known or target channel response and calculates or estimates a loss (thereby implementing the operation 94 of the algorithm 90). Further details of possible loss methods for calculation of this loss, so called loss-functions are provided in detail below.

Figure 11:
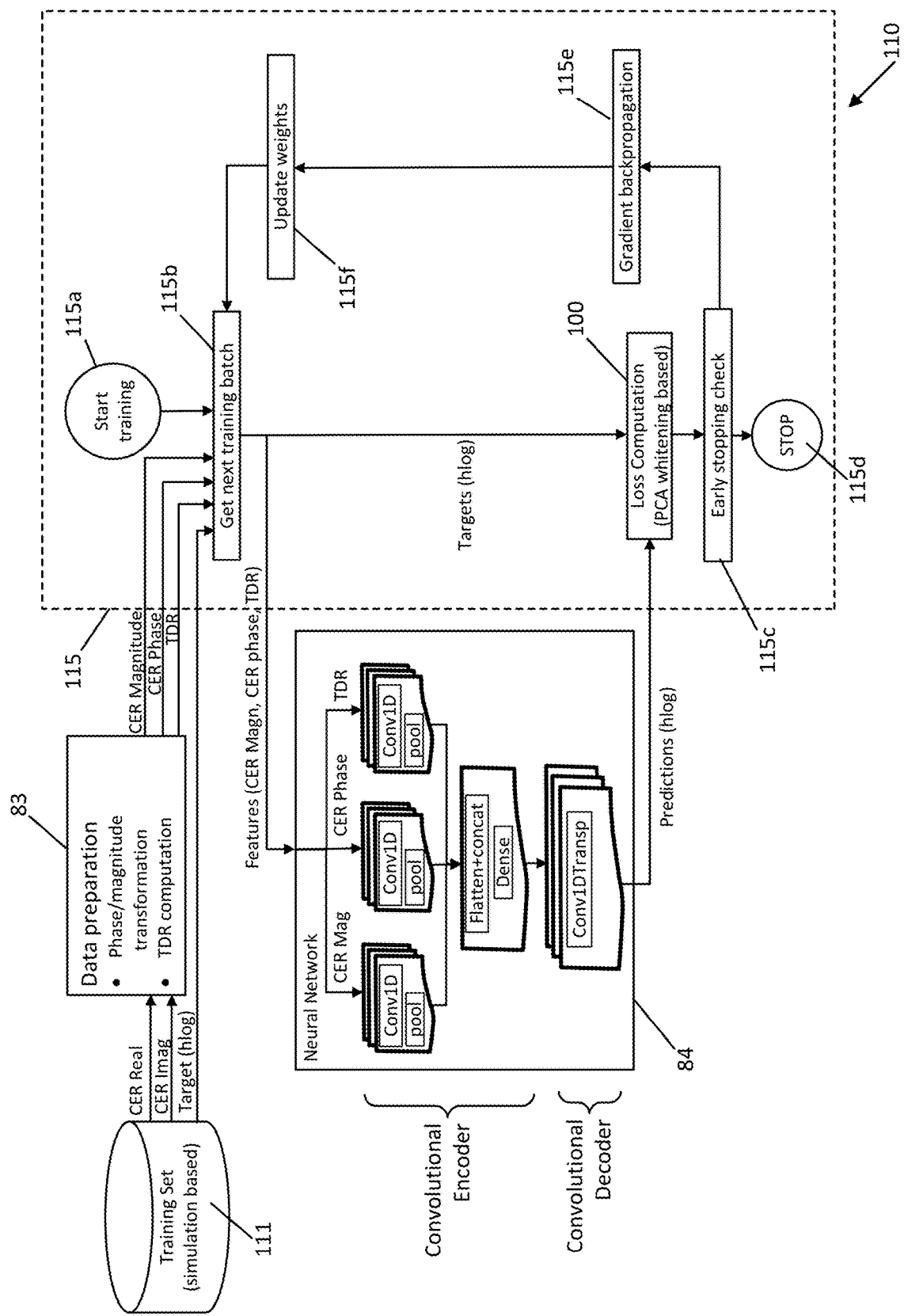
FIG. 11 is a block diagram of a system in accordance with an example embodiment.

FIG. 11 is a block diagram of a means or system, indicated generally by the reference numeral 110, in accordance with an example embodiment of apparatus 40. In this figure the apparatus receives the training data, so the apparatus 40 is depicted during its operation in the training mode.

The system 110 comprises the data preparation module 83 and the convolutional encoder-decoder module 84 of the system 80 described above, the loss computation module 100 described above and a training data generation module 111. The system 110 also shows a module 115 for performing an algorithm described further below.

In a specific embodiment the training data generation module 111 obtains or generates a training set of data. This training data may be generated based on simulation as explained before. As shown in FIG. 11, the training data generation module 111 outputs (simulated) real and imaginary calibrated echo signals (CER real and CER Imag), together with a target channel response.

Sets of calibrated echo signals represented as complex signals having real and imaginary parts as generated by the training data generation module 11 are provided to the data preparation module 83.

As discussed above, the data preparation module 83 converts the calibrated echo signal into CER Magnitude, CER Phase and TDR signals (in this particular example embodiment). The neural network 84 comprising a combination of at least one convolutional encoder—and at least one convolutional decoder generates an estimate of a frequency response of the channel based on the inputs received from the data preparation module 83.

The loss computation module 100 receives the channel estimate from the convolutional encoder-decoder 84 and the target channel response from the training data generation module 11, compares this with the target training H log data provided to this loss computation module as well and calculates a loss for use in updating the weights of the convolutional encoder-decoder 84.

The module 115 starts with receiving a training initiation signal 115*a*, triggering operation of module 115*b* to get a next training batch from data preparation module 83.

The module 115*b* collates a training batch of data. The training data includes the CER Magnitude, CER Phase and TDR signals output by the data preparation module 83 and the target channel response provided by the training data generation module 111. The CER Magnitude, CER Phase and TDR signals of the current batch of training data are provided to the convolutional encoder-decoder 84 and the target channel response is provided to the loss computation module 100.

The convolutional encoder-decoder 84 generates an estimate of a frequency response of the channel, which is also provided to the loss computation module 100. A loss is estimated, based on the target and estimate channel responses, as discussed in detail below.

With the loss estimated, an early stopping check module 115*c* of the module 115 determines whether the functionality of the module 115 is complete or satisfactory (e.g. if a particular model accuracy has been achieved or if the model is no longer learning, thereby avoiding overfitting and/or unnecessarily losing computational resources). If so, module 115 terminates at stop module 115*d*; otherwise, gradient backpropagation is performed by a gradient backpropagation module 115*e*.

With gradient backpropagation performed, the weights of the convolutional encoder-decoder 84 are updated by an updated weights module 115*f*, in accordance with machine-learning principles.

A further batch of training data is then obtained by the get next training batch module 115*b* and the training process is repeated.

A number of possible loss functions that may be used in example implementations of the loss computation module 110 are described below, by way of example.

The loss may be implemented, at least in part, based on root-mean squared error (RMSE) between the target channel frequency response and a channel frequency response estimate. For example, the root mean square error between the target frequency response of the channel and the estimated frequency response of the channel has been defined as an objective to minimize, i.e.:

$$\sum_{i=0}^{len(Hlog)} \sqrt{\|H\log_t[i] - H\log_p[i]\|^2}$$

Figure 12:
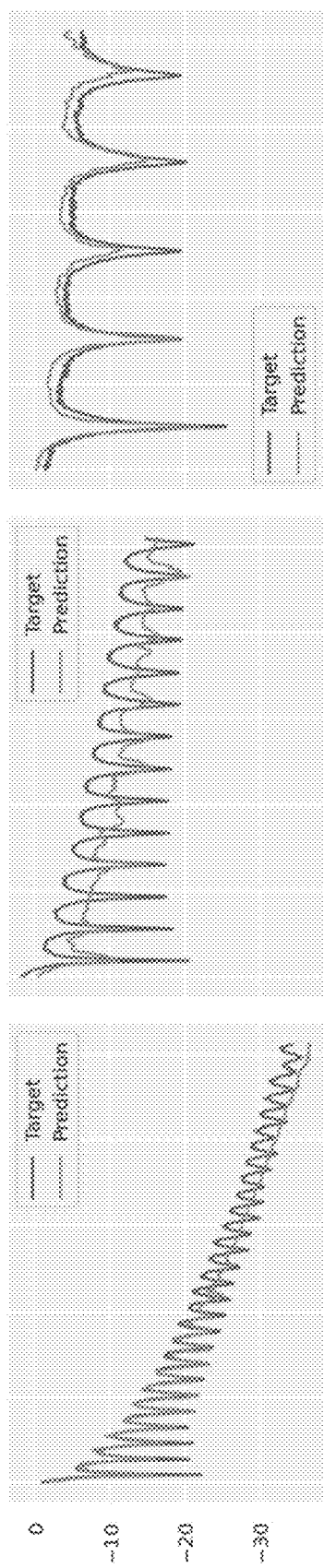
FIGS. 12 to 14 are plots showing outputs of example embodiments.

FIG. 12 is a plot, indicated generally by the reference numeral 120, showing outputs of an example embodiment. The plot 120 shows examples of predicted and target channel estimates using a convolutional encoder trained with an RMSE strategy.

In the plot 120, one can see that larger patterns and/or deeper dips were generally prioritized versus to smoother dips and/or intermediate patterns.

Figure 13:
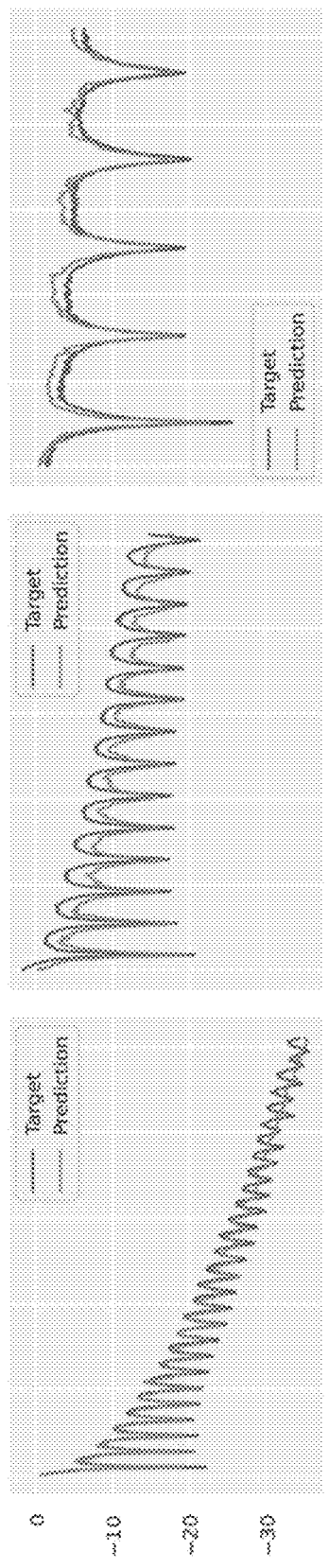

FIG. 13 is a plot, indicated generally by the reference numeral 130, showing outputs of an example embodiment. The plot 130 shows examples of predicted and target channel estimates using a convolutional encoder trained with a hybrid error, such as weighted sum between the general root mean square, a local maximum and a weighting over the derivatives.

An example weighted error may be expressed mathematically as:

$$w_1 * \sum_{i=0}^{len(Hlog)} \sqrt{\|H\log_t[i] - H\log_p[i]\|^2} + w_2 * \max_i \|H\log_t[i] - H\log_p[i]\| +$$

$$w_3 * f(\text{derivatives}(H\log t)) * \sum_{i=0}^{len(Hlog)} \sqrt{\|H\log_t[i] - H\log_p[i]\|^2}$$

The hybrid error may suffer from two potential drawbacks:

The performance may be dependent on the curve shape (an initial positive slope might prioritize a lot the weights there. Also, simply the different loop length, inducing a general slope which is different, might produce different error terms, which is not suitable); and The use of hybrid error may not completely solve the problem between, for instance, dominant/large patterns vs. small/less dominant ones.

In order to capture the relevant information from data, independently from the shape of the patterns and to process it in a fair way, a principal component analysis (PCA plus whitening process may be performed. For example, learning the PCA transformation per batch on the target channel estimates, reducing the dimension (e.g. to 256) and performing a scaling (whitening) function may be suitable. Applying the same learned transformation on the prediction and creating a RMSE between these values may therefore done, i.e.:

$$\sum_{i=0}^{255} \sqrt{\|PCA_{whitened}(H\log_t[i]) - PCA_{whitened}(H\log_p[i])\|^2}$$

This approach tends to process the various types of patterns in a fair way however suffering from a limited ability to take into account the general slope.

As a refinement, an extra term on the batch mean may be added to the global error.

A major contributor to the remaining inaccuracies may reside in the fact that the batch mean may not be suitable for any batch sample. Or, said differently, we are facing a "non-stationary process", at least because the mean between each example may not be the same, hence while applying techniques like principal component analysis (PCA)/whitening, inaccuracies are experienced.

One approach to seek to address this, is to (at least partially) stationarize the batch example, i.e. try to force each sample in the batch to have the same mean. This has been done by fitting a "a*sqrt(f)+b" regression model within the curve, to remove it, and then to follow a similar PCA whitening process as in the previous section. This regression term has therefore to be predicted and added to the error, having therefore a combined objective as follows:

$$\sum_{i=0}^{255} \sqrt{\|PCA_{whitened}(H\log_{t,stationaary}[i]) - PCA_{whitened}(H\log_{p,stationaary}[i])\|^2} +$$

$$w_1 * \sum_{i=0}^{len(Hlog)} \sqrt{\|\text{regression}(H\log_t)[i] - \text{regression}(H\log_p)[i]\|^2}$$

Figure 14:
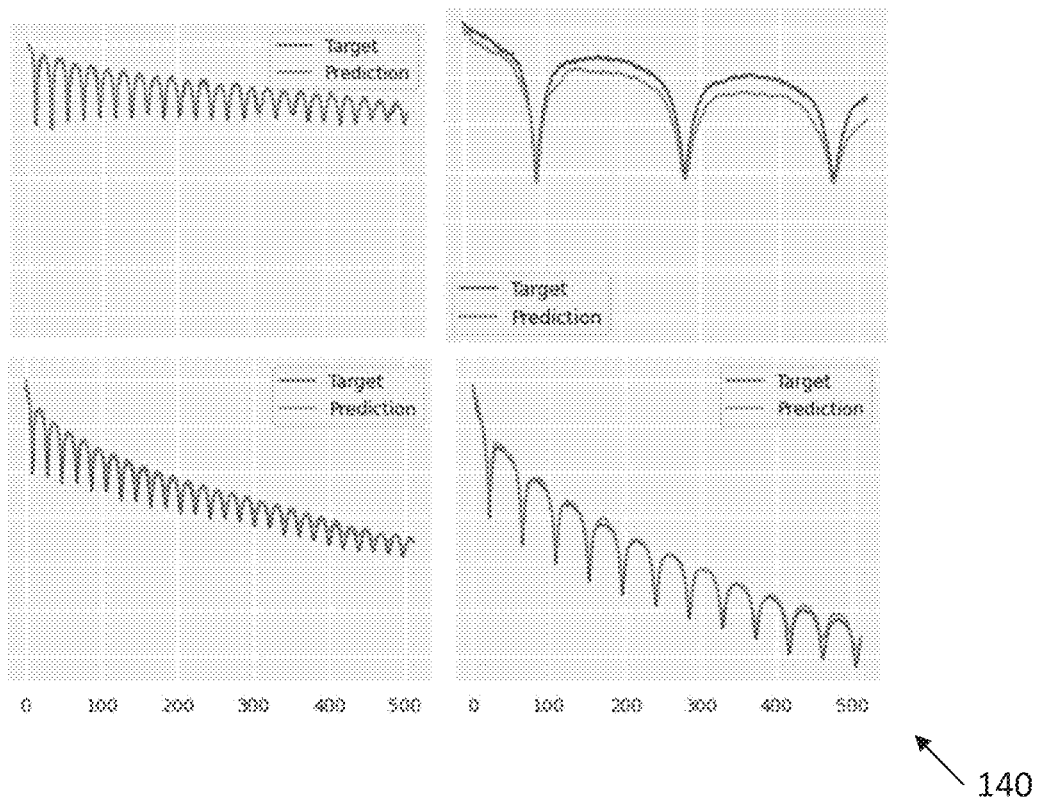

FIG. 14 is a plot, indicated generally by the reference numeral 140, showing outputs of an example embodiment. The plot 140 shows examples of predicted and target channel estimates using a convolutional encoder trained with a combined objective: one on the PCA whitened stationary part and one to estimate the average in order to stationarize the first term. In this embodiment, the error tends to present a fair balance between the two terms.

Figure 15:
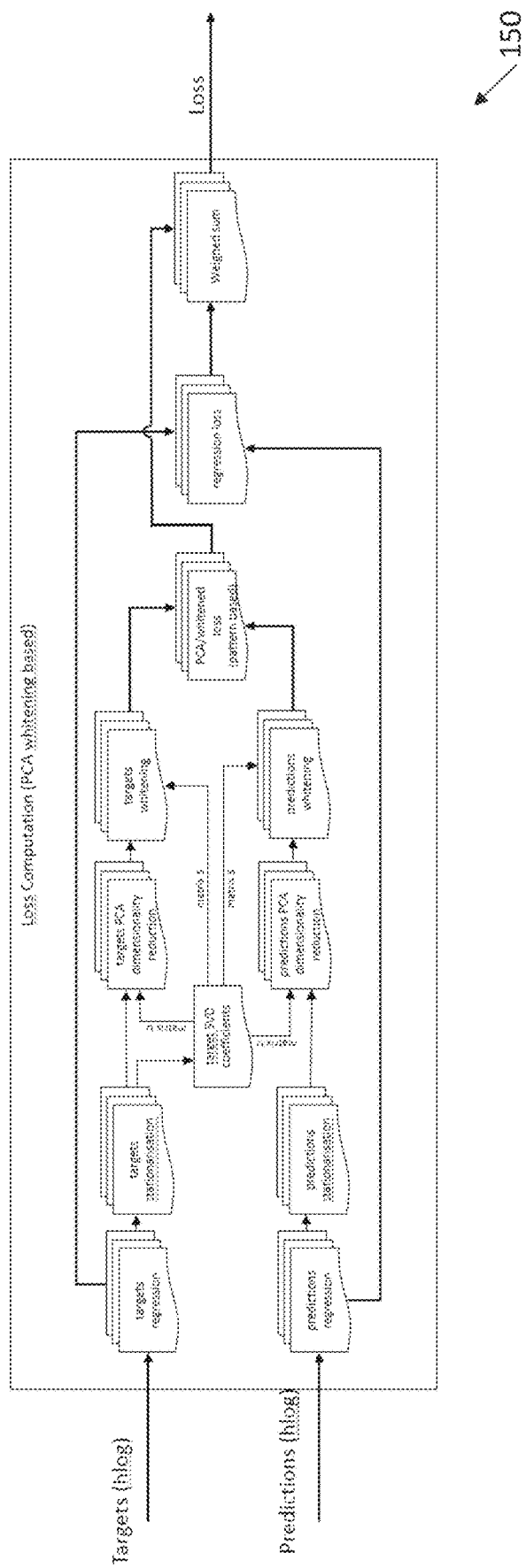
FIG. 15 is a block diagram of a loss computation module in accordance with an example embodiment.

By way of example, FIG. 15 is a block diagram of a loss computation module, indicated generally by the reference numeral 150, in accordance with an example embodiment. The loss computation module 150 is a PCA whitening based loss computation module.

In the field, knowledge in advance of potential impairments present and/or affecting the loop is not typically known. As such, various types of topologies, various types of impairments, various types of cables, various types of termination, various types of interconnections, presence of unbalance etc. may be expected. A U/CER therefore may contain information about these properties. In order to be complete, such methods and system may be extended, trained and validated on a training set containing all these characteristics. Ultimately, this allows to train a Convolutional Encoder able to accept and process any U/CER and, from it, is able to synthetize the corresponding channel frequency response.

Figure 16:
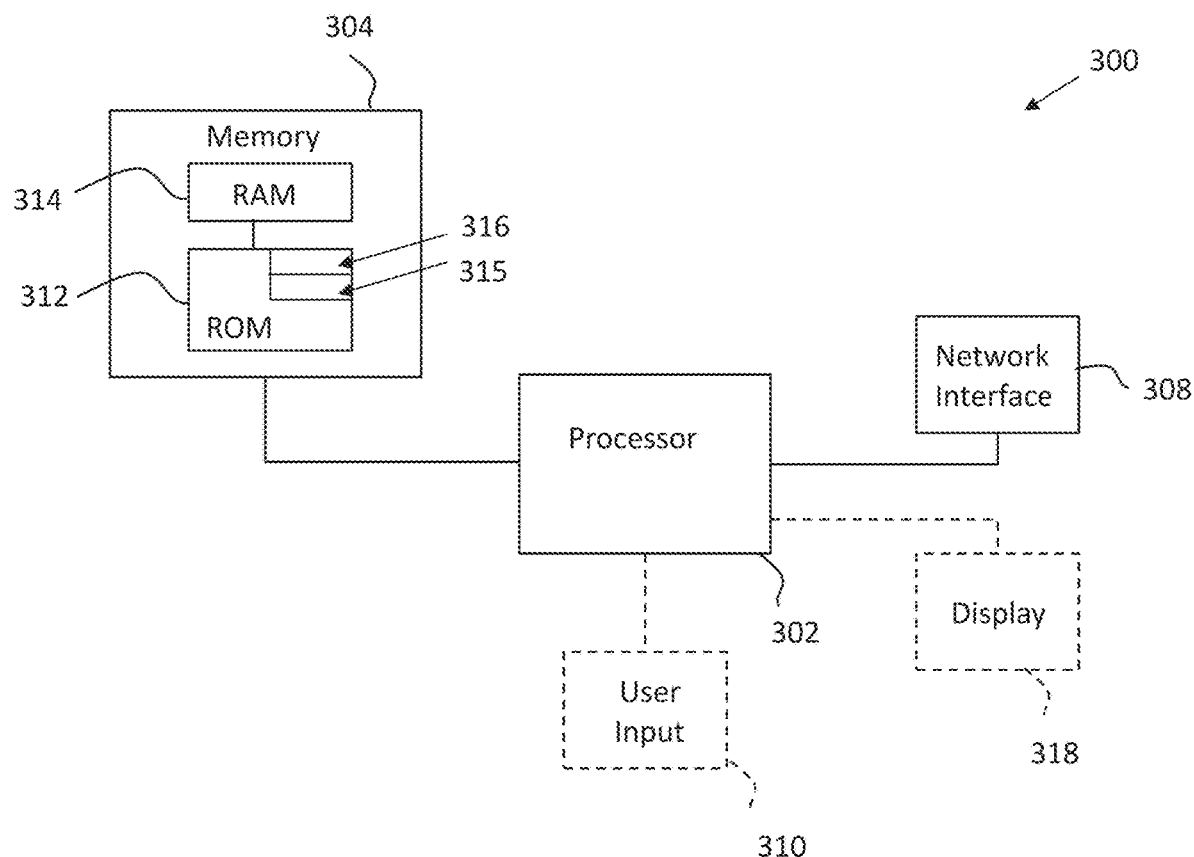
FIG. 16 is a block diagram of components of a system in accordance with an example embodiment.

For completeness, FIG. 16 is a schematic diagram of components of one or more of the example embodiments described previously, which hereafter are referred to generically as a processing system 300. The processing system 300 may, for example, be (or may include) the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the methods and algorithms 50, 70 and 90 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 17:
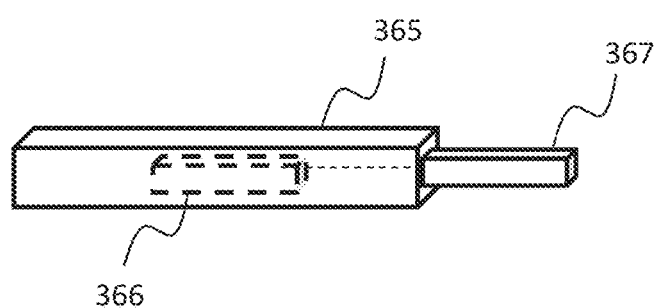
FIG. 17 shows an example of tangible media for storing computer-readable code which when run by a computer may perform methods according to example embodiments described above.

FIG. 17 shows tangible media, specifically a removable memory unit 365, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 5, 7 and 9 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
   at least one processor; and
   at least one memory including computer program code, the at least one memory and computer program code configured to, with the at least one processor, cause the apparatus to perform
   combining first features extracted from an echo signal using a convolutional encoder of a convolutional encoder-decoder having first weights, wherein the echo signal is obtained in response to a transmission over a channel or a simulation thereof, and wherein the first features include signal characteristics of the echo signal; and
   using a convolutional decoder of the convolutional encoder-decoder to generate an estimate of a frequency response of the channel based on the first features extracted from the echo signal, wherein the convolutional decoder has second weights.

2. The apparatus as claimed in claim 1, wherein the at least one memory and the computer program code are configured to, with the at least one processor, cause the apparatus at least to perform obtaining the echo signal in response to a transmission over said channel, wherein the first features are extracted from said obtained echo signal.

3. The apparatus as claimed in claim 1, wherein the channel is a communications medium.

4. The apparatus as claimed in claim 1, wherein the echo signal is represented as a complex signal having real and imaginary parts.

5. The apparatus as claimed in claim 1, wherein the echo signal comprises:
   magnitude data and phase data; and/or
   a time-domain reflectogram.

6. The apparatus as claimed in claim 1, wherein the at least one memory and the computer program code are configured to, with the at least one processor, cause the apparatus at least to perform
   estimating a loss, based on a difference between the estimated channel frequency response estimate and a target channel frequency response; and
   updating said first and second weights based on the estimated loss.

7. The apparatus as claimed in claim 6, wherein the at least one memory and the computer program code are configured to, with the at least one processor, cause the apparatus at least to perform
   obtaining training data including signal characteristics related to one or more network topologies; and
   extracting training features from the training data, wherein the training features include the signal characteristics.

8. The apparatus as claimed in claim 7, wherein the training data are based on echo signals in response to a transmission over said channel.

9. The apparatus as claimed in claim 6, wherein the estimating said loss is based, at least in part, on a root-mean square error between the target channel frequency response and the estimated channel frequency response estimate.

10. The apparatus as claimed in claim 6, wherein the estimating said loss is based, at least in part, on a hybrid error comprising a weighted sum between a root-mean square error, a local maximum and a weighting over derivatives.

11. The apparatus as claimed in claim 6, wherein estimating said loss further includes:
    stationarizing a batch sample to seek to set each sample in the batch to the same mean; and/or
    performing a principal component analysis and whitening process on said batch sample.

12. The apparatus as claimed in claim 1, wherein the echo signal is an uncalibrated echo response or a calibrated echo response.

13. A method comprising:
    combining first features extracted from an echo signal using a convolutional encoder of a convolutional encoder-decoder having first weights, wherein the echo signal is obtained in response to a transmission over a channel or a simulation thereof, and wherein the first features include signal characteristics of the echo signal; and
    using a convolutional decoder of the convolutional encoder-decoder to generate an estimate of a frequency response of the channel based on the first features extracted from the echo signal, wherein the convolutional decoder has second weights.

14. A non-transitory computer readable medium storing instructions, which when executed by a processor, cause an apparatus including the processor to perform at least the following:
    combining first features extracted from an echo signal using a convolutional encoder of a convolutional encoder-decoder having first weights, wherein the echo signal is obtained in response to a transmission over a channel or a simulation thereof, and wherein the first features include signal characteristics of the echo signal; and
    using a convolutional decoder of the convolutional encoder-decoder to generate an estimate of a frequency response of the channel based on the first features extracted from the echo signal, wherein the convolutional decoder has second weights.

* * * * *